Patented Oct. 13, 1925.

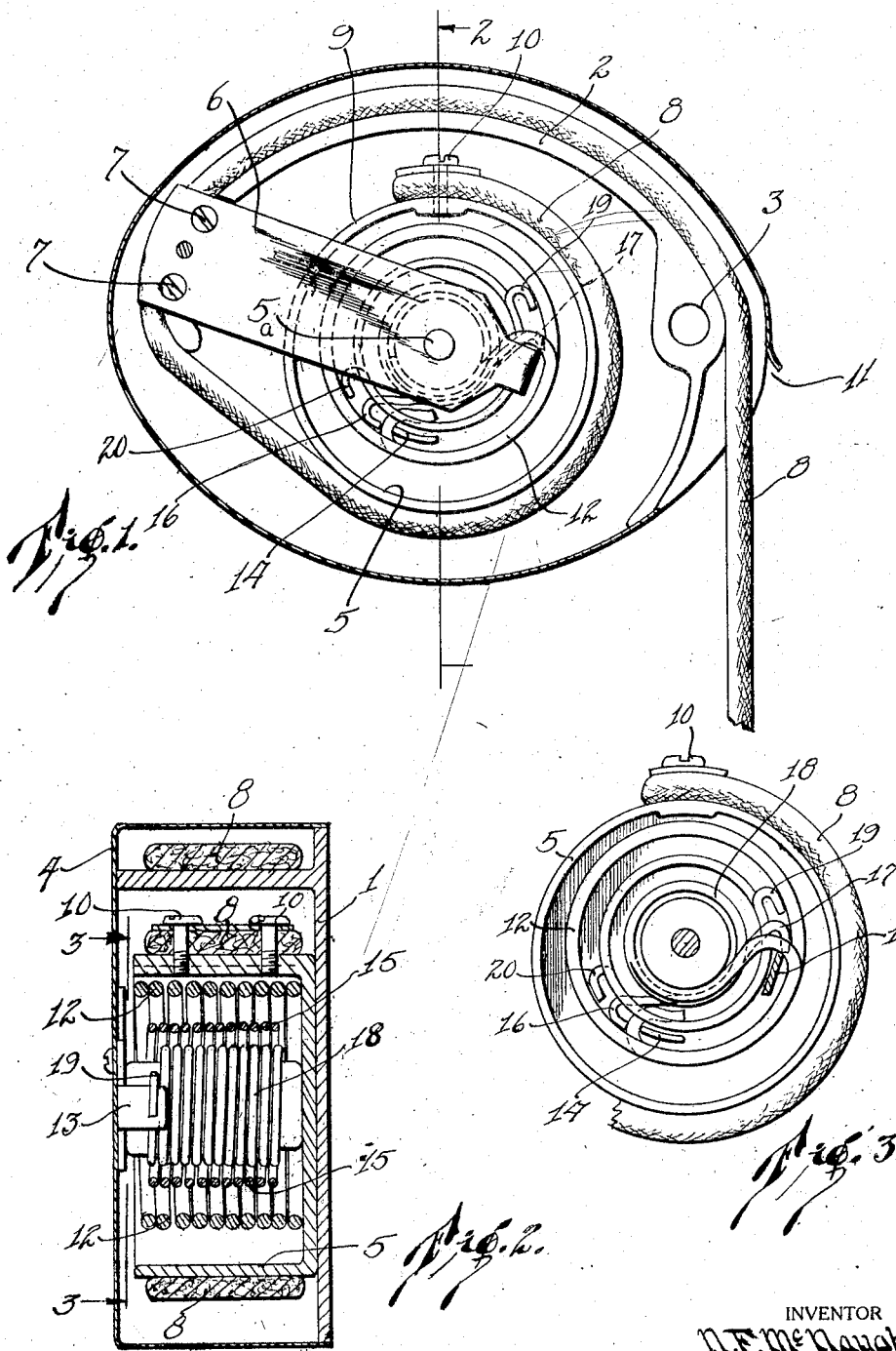

1,557,463

UNITED STATES PATENT OFFICE.

NORRIS F. McNAUGHT, OF CHICAGO, ILLINOIS.

SHOCK ABSORBER.

Application filed November 17, 1924. Serial No. 750,393.

*To all whom it may concern:*

Be it known that I, NORRIS F. MCNAUGHT, a citizen of the United States, and a resident of Chicago, in the county of Cook and State of Illinois, have invented a new and useful Improvement in Shock Absorbers, of which the following is a full, clear, and exact description.

My invention relates to improvements in shock absorbers and it consists in the combinations, constructions, and arrangements herein described and claimed.

An object of my invention is to provide a shock absorber of the character described which may be used efficiently with vehicles equipped with balloon tires, i. e., tires which are several times greater in internal capacity than the type of pneumatic tire employed heretofore. It is essential that a shock absorber or snubber employed for such tires shall at first gradually resist the upward movement of the chassis relative to the wheels and then increasingly resist such movement to a high degree.

A further object of my invention is to provide a shock absorber in which particularly novel means is employed for prolonging the life of the spring means for resisting rotation of the drum, yet which possesses all of the necessary torsional strength desired.

A further object of my invention is to provide a shock absorber in which means is provided aside from the spring means for furthering the gradually increased resistance of the rotation of the drum. This is accomplished by constructing the drum in the form of an eccentric.

A further object of my invention is to provide a shock absorber of the character described that is simple in construction, which may be easily assembled, and which is extremely durable and therefore which will give long continuous service without needing repair.

Other objects and advantages will appear in the following specification, and the novel features of the invention will be particularly pointed out in the appended claims.

My invention is illustrated in the accompanying drawings forming part of this application, in which Figure 1 is a front elevation of an embodiment of my invention with a portion of the casing in section, Figure 2 is a view substantially along the line 2—2 of Figure 1, and Figure 3 is a sectional view along the line 3—3 of Figure 2.

In carrying out my invention I make use of a base member 1 provided with an arcuate friction shoe 2, and is arranged for support upon the chassis frame of a motor vehicle by the projection of a bolt or the like through an opening 3 extending laterally through the body member 1.

The contour of the shoe 2 is substantially semi-elliptical with an enlarged portion through which the opening 3 extends. A metal casing 4 is provided which entirely encompasses that side of the body member from which the shoe 2 extends, thus forming a compartment or housing about the shoe with the body member 1 forming one side wall thereof.

A metal drum 5 is eccentrically and rotatably mounted upon the body member 1 at one end, and upon a pin 5ᵃ at its opposite end, projected inwardly toward the body member and supported upon an arm 6 which is secured to the outer side wall of the shoe 2 by the provision of screws 7 projected through the arm and entering suitable threaded bores through the side walls of the shoe.

A fabric belt or strap 8 is secured to the outer peripheral wall 9 of the drum 5 at 10 by any well known means, such as rivets, screws or the like. The strap 8 is fixed to the drum 5 at that portion of its circumferential surface closest to the pin 5ᵃ. The strap 8 is partially wound around the drum 5 and up over the friction shoe 2.

An opening 11 is provided in the casing 4 through which the strap 8 is projected so that the strap may be fixed to the axle of the motor vehicle or other adjacent parts associated with the axle or axle housing.

Means for winding the strap 8 upon the drum 5 when that portion of the frame of the chassis to which the body member 1 is fixed is moved toward the axle of the vehicle, is provided in a relatively heavy spiral torsion spring 12. This torsion spring is engaged at one end with an inwardly extending lug portion 13 of the arm 6 and at its opposite end with an inwardly extending lug member 14 on the inner side wall of the hollow drum 5. This spring is normally as shown in Figure 1 with its ends in engagement with the lugs 13 and 14, respectively, and under slight tension, sufficient to cause rotation of the drum 5 in a counter clock-wise direction when the strap 8 is slack over the shoe 2, thus winding the strap upon the drum to an extent determinable by the movement of the chassis frame relative to the axle to which the opposite end of the strap is supported.

This spring 12 also serves to take up any slack of the strap 8 over the shoe 2, so that in returning to its normal position the strap must move slowly over the shoe, due to the friction therebetween, which is governed primarily by the strength of the spring or force opposing rotative movement of the drum 5.

Thus when the frame of the chassis is moved toward the axle or axle housing, as in the passing of the vehicle over a rough portion of the road, the spring 12 always serves to take up the slack in the strap 8, and when the chassis frame returns to its normal position it must do so slowly, as the strap moves over the friction shoe 2. In this manner excessive movement of the chassis frame is prevented.

While the spring 12 is sufficiently strong to resist rotation of the drum and thereby increase friction upon the shoe 2, it is desirable that when the chassis is moved sufficiently far away from the axle that increased resistance be given the rotation of the drum. This is brought about by the provision of an intermediate spring 15, lighter in construction than the spring 12, which is provided with hook portions 16 and 17 respectively, at the opposite ends, but which hook portions are normally out of engagement with the lugs 13 and 14 of the arm 6, and the drum 5, when the drum is in the position shown in Figure 1. The drum is rotated in clock-wise direction as shown in Figure 1, and the auxiliary spring 15 will resist further rotation of the drum 5.

It is desirable that still additional resistance to the rotation of the drum be brought about as the springs of the vehicle approach their full expanded position, therefore a second auxiliary spring 18 is provided of substantially the same weight as the spring 15 and with hook members 19 and 20 respectively arranged for engagement with the lugs 13 and 14 of the arm 6 and drum 5 respectively. The hook members 19 and 20 are normally in the position shown in Figure 1 when the drum is in that position. The spring 18 will not become effective in resisting rotation of the drum 5 until the drum has rotated in clock-wise direction sufficiently far to bring the hook member 19 in engagement with their adjacent lugs on the arm and drum. In this manner the spring 18 as well as the spring 15 is held in reserve until the proper time for application.

It is well to note at this time that by the provision of the auxiliary springs 15 and 18 I have overcome the necessity of increasing the size of the spring 12, thus prolonging the life of the spring elements of the shock absorber, since a relatively small spring, i. e., one constructed of steel wire which is relatively small in diameter will last many times longer than one constructed of material having a relatively large diameter.

In order to further assure gradual increasing resistance in the rotation of the drum 5 and thus gradual increasing friction between the strap 8 and the friction shoe 2, the drum 8 is constructed with an eccentric rotatable mounting, so that from the position shown in Figure 1, the leverage between the peripheral wall of the drum 5 and the fulcrum or rotative axis of the drum is greater than that leverage presented as the drum 5 is rotated in a clock-wise direction. Furthermore, this leverage decreases gradually until that portion of the drum to which the strap 8 is secured at 10 arrives at the lowermost side of the drum when wound from the position shown in Figure 1.

From the foregoing description of the various parts of the device the operation thereof may be readily understood. My improved shock absorber is intended particularly for use in motor vehicles employing what is commonly referred to as balloon tires, and when the movement between the chassis frame and the axle is exceedingly great. In order to assure ease and comfort to the occupants of the vehicle, it is desirable that the chassis be free to return to its initial position after the compression of the vehicle spring, at first with a relatively quick movement, and then an increasingly slow movement brought about in such a way as to fully cushion any forces which tend to disturb the occupants of the vehicle.

Let us assume that the chassis is just passing over a depression in the road, and that the chassis frame has moved toward the axle. This will cause some slack in the strap 8 which is immediately taken up by rotation of the drum 5 by virtue of the spring 12, thus the drum 5 will be rotated slightly to a counter clock-wise direction from that position shown in Figure 1. As the spring in the vehicle tends to return the frame to its normal position, the vehicle springs will be resisted slowly by the friction of the strap 8 over the friction shoe 2. This resistance at first will be slight, since the drum is in the position shown in Figure 1 and only the spring 12 is engaged with the drum 5 and the arm 6; also because of the position of the drum 5 which has an eccentric axis. Further movement of the frame by virtue of the springs of the vehicle will bring the first auxiliary spring 15 into engagement with the drum 5 and the arm 6, thus increasing the force resisting rotation of the drum. By this time the drum 5 in rotating has been moved to such a position as to gradually decrease the leverage from its outer peripheral wall to the axis thereof, and this leverage will continue to decrease upon further rotation of the drum.

When the drum 5 is rotated further and the chassis frame is approaching its greatest distance from the axis governed by the expansion of the vehicle spring, the second auxiliary spring 18 will engage with the drum 5 and the arm 6 to resist rotation of the drum. At this time friction between the strap 8 and the shoe 2 is at its greatest.

The gradually increasing resistance of the drum 5 is one of the important features of my improved shock absorber. By the use of auxiliary spring I find that the spring 12 need not be constructed of heavy material to accommodate the present type of balloon tires, and the additional auxiliary springs greatly increase the life of the spring 12 and of the shock absorber.

I claim:

1. A shock absorber of the character described comprising a strap arranged to be fixed to the axle or the like of a motor vehicle, a rotatably mounted drum arranged for disposition upon the frame of a motor vehicle, a friction shoe adjacent to said drum, said strap being arranged to pass over said shoe, and means for gradually resisting the rotation of said drum when said strap is unwound therefrom.

2. A shock absorber of the character described comprising a drum mounted for rotation, a friction shoe, a strap arranged to move over said shoe and secured at its opposite end to the peripheral wall of said drum, a spring for resisting rotation of said drum in one direction, and an auxiliary spring for resisting the rotation of said drum in one direction and for augmenting the resistant force of said first named spring after said drum has rotated a predetermined degree.

3. A shock absorber of the character described comprising a drum mounted for rotation, a friction shoe, a strap arranged to move over said shoe and secured at its opposite end to the peripheral wall of said drum, a spring for resisting rotation of said drum in one direction, an auxiliary spring for resisting the rotation of said drum in one direction and for augmenting the resistant force of said first named spring after said drum has rotated a predetermined degree, and a second auxiliary spring for still further resisting the rotation of said drum and for augmenting the resisting force of said first named spring and said auxiliary spring after said drum has rotated a predetermined degree.

4. A shock absorber of the character described comprising a drum mounted for rotation, a friction shoe, a strap arranged to ride over said shoe and having one end secured to the peripheral wall of said drum, a spring for resisting the rotation of said drum in one direction and for taking up slack in said strap over said shoe, and auxiliary springs for resisting the rotation of said drum and for augmenting the force applied to said drum by said first named spring after said drum has rotated a predetermined degree.

5. A shock absorber of the character described comprising a drum mounted for rotation, a friction shoe, a strap arranged to ride over said shoe and secured at one of its ends to the peripheral wall of said drum, a spring associated with said drum for rotating said drum in one direction and thereby taking up slack in said strap on said shoe, and auxiliary springs for augmenting the force exerted by said first named spring and opposing rotation of said drum in a direction opposite to that imparted to said drum by said first named spring.

6. A shock absorber of the character described comprising a drum mounted for rotation, a strap secured at one end of the peripheral wall of said drum and wound therearound, a spring for resisting the rotation of said drum in one direction, and an auxiliary spring concentric with said first named spring for resisting the rotation of said drum in one direction and for augmenting the resisting force of said first named spring after said drum has rotated a predetermined degree, said auxiliary spring being constructed of metal of lesser diameter than the first named spring.

NORRIS F. McNAUGHT.